INVENTORS
WILBUR F. JACKSON &
JOHN W. WRIGHT

BY Anthony A. O'Brien

ATTORNEY

*INVENTORS*
WILBUR F. JACKSON &
JOHN W. WRIGHT

BY Anthony A. O'Brien

*ATTORNEY*

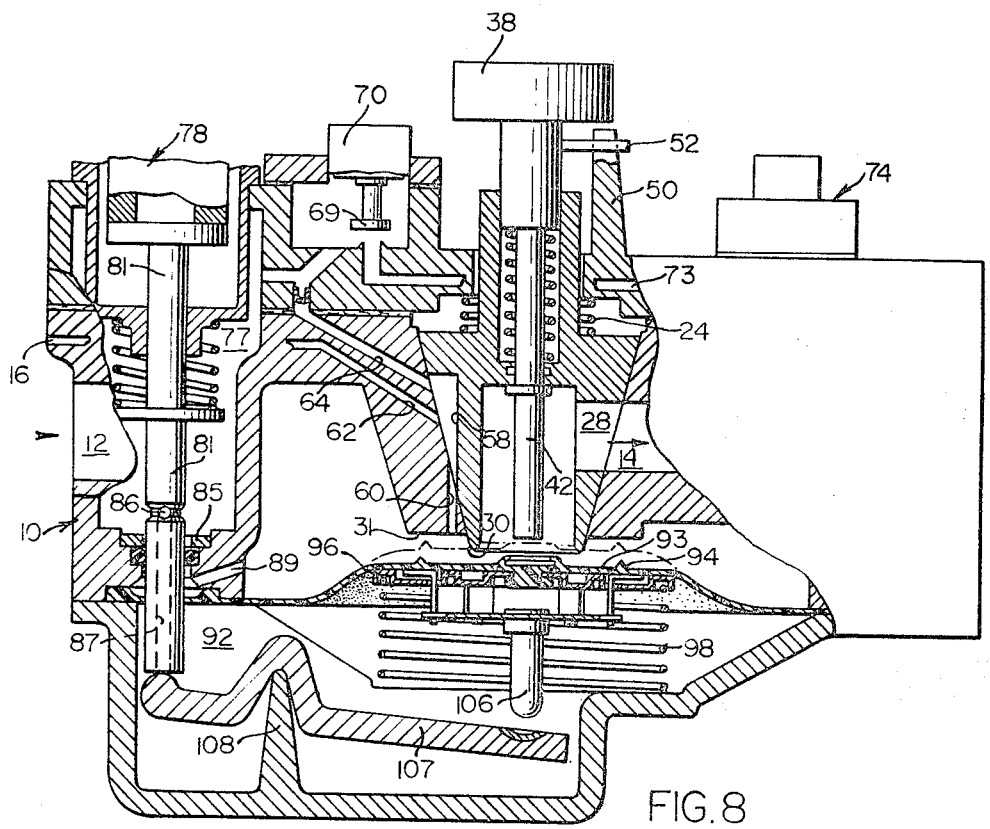
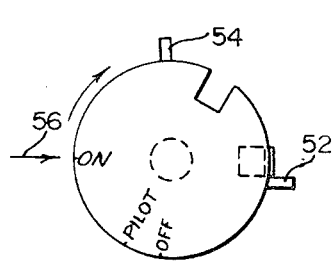
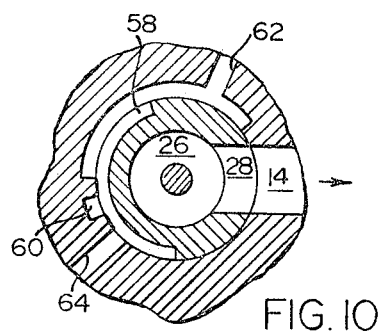
INVENTORS
WILBUR F. JACKSON &
JOHN W. WRIGHT
BY Anthony A. O'Brien
ATTORNEY United States Patent Office 3,433,409
Patented Mar. 18, 1969

3,433,409
COMBINED TEMPERATURE AND PRESSURE
CONTROLLED VALVE
Wilbur F. Jackson, Rolling Hills, and John W. Wright,
Long Beach, Calif., assignors to Robertshaw Controls
Company, Richmond, Va., a corporation of Delaware
Filed Sept. 16, 1966, Ser. No. 580,004
U.S. Cl. 236—9                                    11 Claims
Int. Cl. F23n 1/00; F23d 13/46; F23q 9/12

ABSTRACT OF THE DISCLOSURE

A combination control device for main and pilot burner apparatus, wherein a pressure responsive modulating valve includes a diaphragm assembly having two concentric valves on a single diaphragm; the two valves operate independently but limit the pressure drop to a single passage whereby the capacity of the control device may be increased. The main diaphragm valve cooperates with the bottom opening of a manually rotatable plug valve and a larger concentric seat on the main diaphragm cooperates with the casing to control a bleed flow and pilot flow porting.

---

This invention relates to a combination control device for burner apparatus and, more particularly, to a combined temperature and pressure control device wherein diaphragm valve means controls the flow of fuel to burner apparatus in response to temperature variations in the space being temperature controlled and regulates the pressure of such flow.

It is common practice to include an automatic pilot valve in control systems for burner apparatus so that a flame at the pilot burner will be available to ignite the main burner which is operated by thermostatically cycling means. An automatic pilot valve which is separate and distinct from a thermostatically controlled automatic valve is desirable from the standpoint of safety as failure of the automatic valve will not directly affect the automatic pilot valve. In systems and controls utilizing conventional valve structures, capacity is sacrificed when two distinct valves are used due to the pressure drops of the two valves acting to lower the flow obtainable through the system or control at a specified pressure drop.

It is, therefore, an object of the present invention to limit the pressure drop to a single passage in a fuel flow control device having two distinct valves.

Another object of this invention is to increase the capacity of a fuel flow control device having plural independent valve seats and valve operating means.

The present invention has another object in that the differential pressure operated valve of a fuel flow control device includes a diaphragm asesmbly having two concentric valves that are independently operated.

This invention has another object in that a manual on-off valve in a diaphragm type control also provides manual control of a pilot flow line and a bleed flow line for controlling fuel supplied to burner apparatus.

A further object of the present invention is to provide a fuel flow control device having a differential pressure operated diaphragm valve with a main bleed line for normal operation of such valve and with a by-pass bleed line for automatic safety operation of such valve.

In practicing the present invention, a preferred embodiment is constructed to include a control device casing having primary and secondary flow passages, primary and secondary valve seats in the casing for the respective primary and secondary flow passages with the secondary valve seat being radially spaced from the primary valve seat, a diaphragm assembly having a flexible diaphragm and mounting means therefor, primary and secondary valving elements on said flexible diaphragm independently cooperating with the respective primary and secondary valve seats, the primary and secondary valving elements being concentrically arranged on the flexible diaphragm whereby a pressure drop across the primary and secondary valve seats is limited to the pressure drop across the primary valve seat.

Other objects and advantages of the present invention will become apparent from the following description of a preferred embodiment in conjunction with the accompanying drawings wherein:

FIG. 8 is a partial cross section view similar to FIGS. 1 and 5 with the components shown in their "on" position;

FIG. 9 is a top plan view similar to FIGS. 2 and 6 but with the manual plug valve dial being rotated to its "on" position as shown in FIG. 8; and FIG. 10 is a partial cross section view similar to FIGS. 3 and 7 but with the manual plug valve being rotated to its "on" position as shown in FIG. 8.

Figure 1:
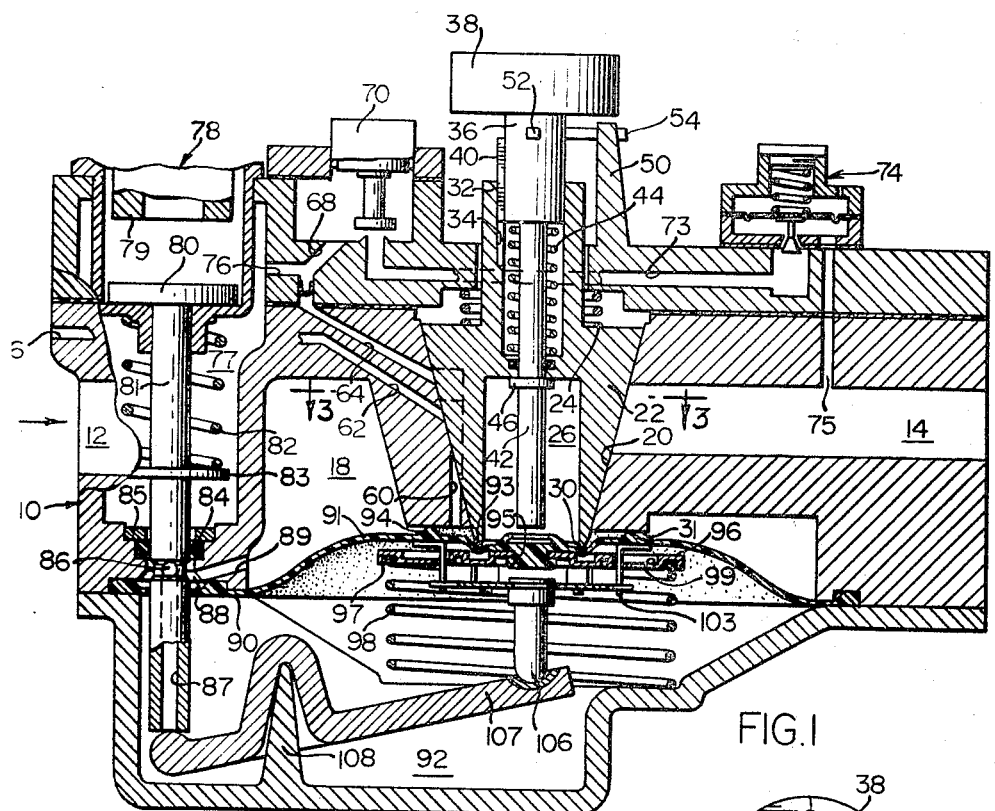
FIG. 1 is a schematic cross sectional diagram with parts broken away of a control device embodying the present invention.

As illustrated in FIG. 1, the present invention is embodied in a control device, indicated generally at 10, in the form of a casing made of three sections secured together by any suitable fastening means, such as bolts (not shown). The casing 10 includes an inlet port or passage 12 adapted to received a flow of fuel from a gas source (not shown), a main outlet port or passage 14 adapted for connection to a main burner MB, and a pilot outlet port 16 adapted for connection to a pilot burner PB which is disposed in igniting proximity to the main burner MB; see FIG. 5. The inlet 12 communicates with an inlet chamber 18, a wall portion of which is defined by an internal casing wall that has a frusto-conical bore 20 communicating with the inlet chamber 18. A manually operated, frusto-conical plug valve 22 is rotatably seated in the bore 20 and is biased therein by a coil spring 24 mounted in compression between the large end of the plug valve 22 and an internal wall of the casing 10. The bottom wall of plug valve 22 is axially hollowed out to define a cylindrical chamber 26, the outlet of which is defined by a transverse opening 28 in the conical wall of the plug valve 22 and being sized to register with the main outlet passage 14. The truncated end of plug valve 22 has annular V-shaped cross section (FIG. 5) which extends out of the bore 22 and slightly into the inlet chamber 18 and which defines a primary or inlet valve seat 30 for the plug valve chamber 26. The internal wall of casing 10 through which the main inlet valve seat 30 protrudes has an annular surface area which communicates with the inlet chamber 18 and which defines a secondary or pilot valve seat 31; the two valve seats 30 and 31 are thus concentrically arranged with the pilot valve seat 31 being diametrically larger than the main valve seat 30.

A valve stem 32 centrally extends from the large end of the plug valve 22 through a suitable opening in the wall of casing 10; a central bore 34 in the valve stem 32 receives the shaft 36 of a manually operated dial 38, which shaft is fixed to the stem 32 for unitary rotation by any suitable means, such as a longitudinal keyway receiving a key 40 integrally attached to the shaft 36. The shaft 36 is reduced in diameter at 42 to slidably protrude through a reduced end of the bore 34 into the plug valve chamber 26. A coil spring 44 in the stem bore 34 encircles that portion of the reduced shaft 42 in bore 34 and is mounted in compression between the end of shaft 36 and the plug valve wall which separates chamber 26 from bore 34. A collar 46 on that portion of the reduced shaft 42 in the plug valve chamber 26 limits the upward movement of the shaft 36 and prevents its ejection from the bore 34 under the normal bias of the coil spring 44.

Figure 2:
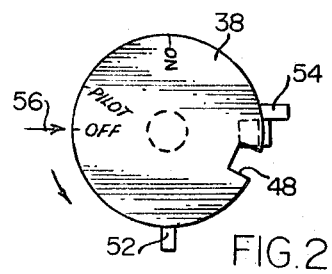
FIG. 2 is a top plan view of a detail of FIG. 1 showing the "off" position of the manual plug valve dial.
Figure 4:
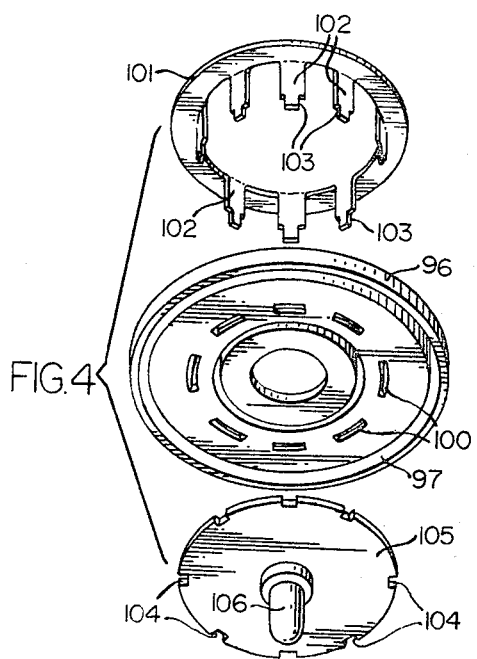
FIG. 4 is an exploded perspective view of an assembly detail of FIG. 1.

As is illustrated in FIG. 2, the dial 38 has a peripheral slot 48 which is large enough to receive an interlock projection 50 carried on the outer wall of casing 10 under the dial 38. The projection 50 and slot 48 provide a "pilot" position for the dial 38 which permits depression of the dial 38 as will be described more fully hereinafter. The dial 38 and plug valve 22 are rotated as a unit between controlling positions and any suitable stop means may be utilized to limit the rotation thereof, such as "on" and "off" stops 52 and 54, respectively, radially projecting from the shaft 36 to alternately engage the side walls of projection 50. A fixed reference indicia 56 on the exterior wall of casing 10 provides a reference for "off," "pilot" and "on" position markings on the top of the dial 38. The "pilot" position is angularly displaced approximately 25 degrees from the "off" position and the "on" position is angularly displaced approximately 90 degrees from the "off" position; similarly, the "pilot" position slot 48 is angularly displaced 25 degrees from the "off" stop 54 and the "on" stop 52 is angularly displaced 90 degrees from the "off" stop 54.

Figure 3:
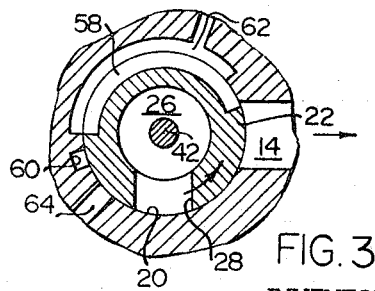
FIG. 3 is a partial cross section view taken on line 3—3 of FIG. 1 showing the "off" position of the manual plug valve.

As is shown in FIG. 3, the conical wall of the plug valve 22 is provided with an arcuate groove 58 having an angular dimension of approximately 165 degrees for a purpose to be described more fully hereinafter. The groove 58 is generally oppositely disposed to the plug valve outlet opening 28 and its arcuate length is dimensioned to span conduits in casing 10 that open into the conical bore 20. Adjacent the frustrum end opening of the conical bore 20, the internal wall of casing 10 has a pilot inlet conduit 60 extending in spaced parallel relation to the central axis of the plug valve 22 and being disposed between the concentric valve seats 30 and 31. The plug valve 22 and its groove 58 thus control the flow of pilot gas from the pilot flow inlet 60 to a pair of spaced conduits 62 and 64, the conduit 62 defining a pilot flow outlet conduit communicating with the pilot outlet port 16 and the conduit 64 defining a bleed flow conduit for a bleed flow of gas.

Figure 5:
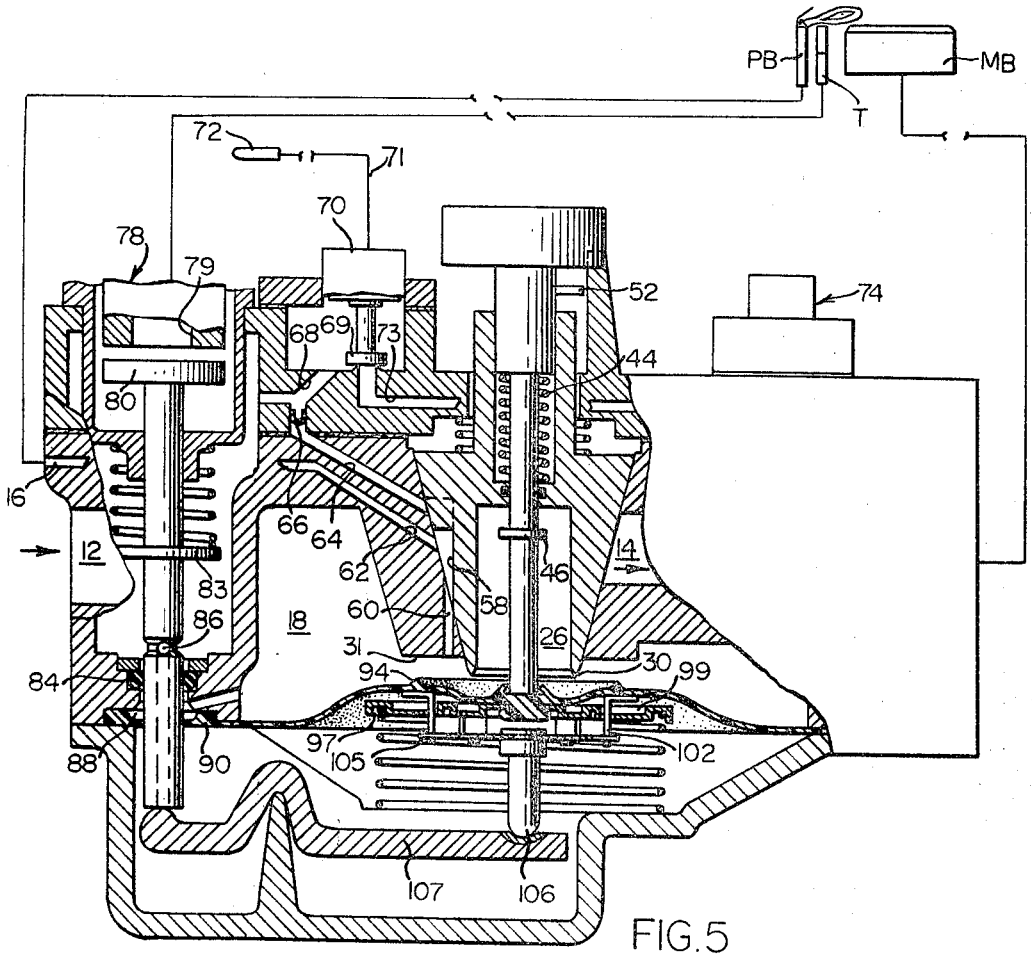
FIG. 5 is a partial cross section view similar to FIG. 1 with the components shown in their "pilot" position and with a schematic diagram added to show the controlled burner apparatus.
Figure 7:
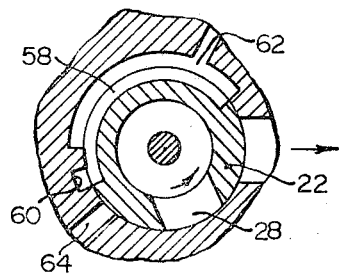
FIG. 7 is a partial cross section view similar to FIG. 3 but with the manual plug valve being rotated to its "pilot" position as shown in FIG. 5.

As is shown in FIG. 3, the conduits 62 and 64 open into the conical bore 20 in spaced angular relation to each other with the conduit 60 opening located therebetween. For the sake of brevity in description and to facilitate a clear understanding of the drawings, the spacing between the conduits 62 and 64 are illustrated in FIGS. 1, 5 and 8 in a vertical alignment, so it is to be understood that conduit 62 includes an arcuate slot opening into the conical bore 20 (see FIG. 3); such an arrangement permits the pilot outlet port 16 to be located closer to the main outlet port 14 whereby both outlet ports 14 and 16 are easily connected to the burner apparatus. As is apparent from FIGS. 3, 7 and 10, the pilot outlet conduit 62 is always in communication with the plug valve groove 58 even though the schematic diagram of FIG. 1 shows all three conduits 60, 62 and 64 being closed by the plug valve 22; the arcuate groove 58 is also shown schematically in FIGS. 1, 5 and 8 to establish the various communication paths according to the rotated position of the plug valve 22.

Downstream of a flow restrictor 66, the bleed conduit 64 feeds a pair of branch bleed conduits. The first branch bleed conduit 68 leads to a thermostatically operated valve 69 which includes an operator 70. The operator 70 may be of any suitable type such as electric responding to a thermostat in the space being temperature controlled, or as shown on FIG. 5, the operator 70 may be a hydraulic type including a bellows (not shown) being connected to one end of a capillary tube 71, the other end of which is provided with a thermal sensing bulb 72 that is suitably located in the space being temperature controlled by the burner apparatus PB and MB. The bellows, capillary tube 71 and sensing bulb 72 comprise a closed system filled with a thermally expansible fluid so that a variation of temperature sensed by the bulb 72 cycles the valve 69 between on and off positions. The downstream side of valve 69 communicates with a branch bleed conduit 73 that leads to a bleed flow pressure regulator, indicated generally at 74; the downstream side of pressure regulator 74 communicates with a branch bleed outlet conduit 75 that leads to the main outlet passage 14 whereby the pressure regulator 74 senses main flow outlet pressure to throttle the bleed gas flow to the main outlet passage 14.

The second branch bleed conduit 76 leads to a chamber 77 in which is disposed an electromagnetic holding device 78. As is well known in the art, the electromagnetic holding device includes a magnet core 79 having an electric coil (not shown) wound thereon which is connected as by a lead cable to a thermocouple T which is disposed in the flame of the pilot burner PB. A keeper 80 for the magnet core 79 has a stem 81 protruding through a sealed opening in the housing of the holding device 78; a coil spring 82 surrounds the upper portion of the stem 81 and is mounted in compression between the lower surface of such housing and an annular collar 83 fixed to the stem 81 intermediate the ends thereof.

The lower portion of the stem 83 protrudes through a stepped opening in an internal wall of casing 10, which opening is sealed by a resilient O-ring 84 held in place as by a snap ring 85. Spaced below the collar 83, the stem 81 is provided with a transverse bore 86 and axial bore 87 communicating with each other to define a T-shaped passage. Below the O-ring seal 84, the stepped opening defines a by-pass bleed chamber 88 which communicates with the main inlet chamber 18 by means of a by-pass bleed conduit 89. One end of the by-pass bleed chamber 88 is sealed by the O-ring 84 and the opposite end is sealed by an apertured tab 90 integrally formed on a flexible diaphragm 91 which is made of suitable resilient material, such as rubber. The upper surface of diaphragm 91 defines a movable wall for the main inlet chamber 18 while its lower surface defines a movable wall for a operating pressure chamber 92; the periphery of the diaphragm is sealed and clamped between adjacent edges of the casing sections.

As is shown in FIG. 1, a central annular portion of the diaphragm 91 defines a main valve member 93 which engages the main valve seat 30 and an outer concentric rib defines a pilot valve member 94 which engages the pilot valve seat 31. An enlarged central hub 95 on the lower surface of the diaphragm 91 has a peripheral groove for snap mounting a back-up assembly thereto. The back-up assembly includes a rigid diaphragm pan 96 having a central aperture sized to be snap fitted in the grooved hub 95. Adjacent its outer periphery the undersurface of the pan 96 has an annular recess 97 for retaining one end of coil spring 98 which is mounted in compression between the pan 96 and a wall portion casing 10; adjacent the recess 97 but on the upper surface of pan 96, the pan has an annular recess 99 with a plurality of spaced slots 100 extending therethrough adjacent the inner periphery of the recess 99. A pilot valve ring 101 is disposed for movement in and out of the annular recess 99 and has a plurality of perpendicularly bent tabs 102 extending downwardly from the inner periphery of the ring 101 through the corresponding plurality of slots 100. Each tab 102 terminates in a reduced attachment lug 103 which project through a similar plurality of notches 104 disposed around the periphery of a retainer plate 105 for attaching the same to the ring 100. A stud 106 is centrally fixed to the retainer plate 105 and projects downwardly therefrom for engagement with one end of a reset lever 107. The opposite end of lever 107 engages the free end of the magnet stem 81 but does not interrupt the communication between the stem bore 87 and the operating pressure chamber 92. As is illustrated in FIG. 8, the lever 107 is pivotally mounted on a fulcrum 108 integrally formed as an internal wall of the casing 10; the lever 107 has a fulcrum point closer to the end that engages the free end of stem 81 with a longer moment arm on the other end of lever 107 so that the end adjacent stud 106 does not normally engage such stud 106. Thus, the lever 107 does not interfere with the regulatory movement of the diaphragm 91.

Operation

FIGS. 1, 2 and 3 represent the "off" position of the control device; i.e., in the "off" position of dial 38 (see FIG. 2), the plug valve porting 28 and groove 58 (FIG. 3) are not aligned with the main outlet passage 14 and the pilot inlet conduit 60, respectively, so there is no flow to either the main burner MB or the pilot burner PB. Since there is no flame at the pilot burner PB, the electromagnetic holding device 78 is deenergized causing the valve stem 81 (FIG. 1) to be biased downwardly whereby the lever 107 has moved the retainer plate 105 and the pilot valve ring upwardly to close the pilot valve 94 on the pilot valve seat 31; in such position, the valve stem bore 86 communicates with the by-pass bleed chamber 88 whereby the operating pressure chamber 92 is subject to main inlet pressure to assure closure of main valve member 93 on the main valve seat 30.

Figure 6:
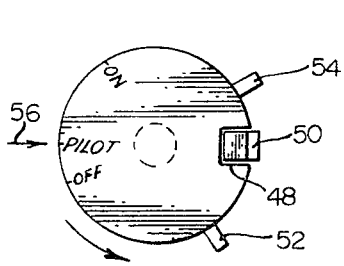
FIG. 6 is a top plan view similar to FIG. 2 but with the manual plug valve dial being rotated to its "pilot" position as shown in FIG. 5.

To initiate operation of the control device, the dial 38 must first be rotated counterclockwise from its "off" position of FIG. 2 to its "pilot" position of FIG. 6 so that the dial slot 48 is superimposed over the projection 50. In such "pilot" position, the main outlet opening 28 of plug valve 22 is still out of registry with main outlet passage 14, so there is no flow to the main burner MB; however, the plug valve's pilot flow groove 58 is aligned with the pilot flow inlet conduit 60 (see FIG. 7). The dial 38 is now depressed against the bias of coil spring 44 so that the end of reduced shaft 42 moves the entire diaphragm assembly downwardly as viewed in FIG. 5 and causes the stud 106 to pivot the lever 107 clockwise about the fulcrum 108 whereby the stem 81 and magnet keeper 80 is moved upwardly toward the magnet core 79; FIG. 5 represents the relative positions of the components just before the keeper 80 engages the magnet core 79. A pilot flow of fuel may now be traced from the main inlet passage 12 through the main inlet chamber 18, the pilot inlet conduit 60, the plug valve groove 58, the pilot flow outlet conduit 62 and the pilot outlet port 16 to the pilot burner PB where it is ignited as by a match. As soon as the flame from the pilot burner PB sufficiently heats the thermocouple T, the electromagnetic holding device 78 is energized whereupon the dial 38 may be released and the lever 107 assumes its non-engaged position as illustrated in FIG. 8. During this operation of igniting the pilot burner PB, the by-pass bleed chamber 88 is cut off nd the plug valve 22 precludes communication between the pilot inlet flow conduit 60 and the bleed flow conduit 64 (FIG. 7); thus there is no bleed flow to the operating pressure chamber 92 and the pressure therein is reduced because of communication with the chamber 77 through the stem bores 87 and 86. The greater pressure in the main inlet chamber 18 then acts on the upper surface of the diaphragm 91 to flatten the same against the diaphragm pan 96 and return the pilot valve ring 101 to the pan recess 99.

After release of the dial 38, the dial 38 is rotated further counterclockwise from the "pilot" position of FIG. 6 to the "on" position of FIG. 9 where the stop 52 engages the side of projection 50. In such "on" position, the plug valve 22 has its main outlet opening 28 aligned with the main outlet passage 14 and its arcuate groove 58 establishes communication between the pilot flow inlet conduit 60 and the two spaced conduits 62 and 64. As is shown in FIG. 10, the plug valve groove 58 has sufficient arcuate length to maintain continuous communication with pilot flow outlet conduit 62 during rotation of plug valve 22 to its "on" position wherein the groove 58 establishes communication with the bleed flow conduit 64. Accordingly, a bleed flow of gas may be traced from the plug valve groove 58 through the bleed flow conduit 64 and its flow restrictor 66 whence it proceeds into a pair of branch bleed conduits 68 and 76 depending upon the opened and closed position of the thermostatically operated valve 69. If the valve 69 is closed, the bleed flow of gas may be traced from the branch bleed conduit 76 through the chamber 77, and the stem bores 86 and 87 to the operating pressure chamber 92. Equalization of pressure between chambers 18 and 92 permits closure movement of the diaphragm 91 by the coil spring 98 whereby the primary valve member 93 closes on the primary valve seat 30 as shown in dashed lines on FIG. 8 to prevent a main flow of gas to the main burner MB.

If the thermostatically operated valve 69 is opened, the bleed flow of gas may be traced from the branch bleed conduit 68 through the open valve 69, the branch bleed conduit 73, the bleed flow pressure regulator 74 and the branch bleed outlet conduit 75 to the main outlet passage 14. Such opening of the valve 69 also bleeds the operating pressure chamber 92 in a path traced therefrom through the stem bores 87 and 86, the chamber 77 and the branch bleed conduit 76, whence it follows the above bleed path to the bleed outlet conduit 75. Reduction of pressure in the operating pressure chamber 92 causes the diaphragm 91 to be moved to its open position (FIG. 8) because the pressure in the inlet chamber 18 exerts a greater force on the diaphragm 91 than the biasing spring 98. The diaphragm 91 modulates the flow through the main outlet passage 14 to the main burner MB in accordance with variations in the rate of flow through the bleed line as controlled by the pressure regulating valve 74.

The fuel at the main burner MB is ignited by the flame of the pilot burner PB and as soon as the temperature requirements in the space being temperature controlled are satisfied as sensed by the bulb 72, the thermostatically operated valve 69 is closed and the bleed flow is diverted to the operating pressure chamber 92 resulting in closure of the main valve members 93 and 30. When the temperature requirements in the space being temperature controlled become unsatisfied, as determined by the thermal sensing bulb 72, the thermostatically operated valve is again opened whereupon the operating pressure chamber 92 is depressurized by being bled to the bleed flow outlet conduit 75 and the main valve elements 93 and 30 are opened to supply fuel to the main burner MB.

The main burner MB will be thus cycled thermostatically in accordance with temperature demand as sensed by the thermal sensing bulb 72. In the event the flame at the pilot burner PB should be extinguished for any reason, the thermocouple T will cool and the electromagnetic coil of the safety holding device will be deenergized causing release of the keeper 80 from the core 79 under the biasing action of the coil spring 82. The stem 81 then pivots the lever 107 counterclockwise about its fulcrum 108 whereupon the stud 106 and plate 105 forces the pilot valve ring 101 out of the pan recess 99 so that the safety pilot valve member 94 engages the secondary valve seat 31 and the main valve member 93 engages the primary valve seat 30 to effect 100% shut off of all fuel flow. To reestablish the flame at the pilot burner PB, the igniting procedure outlined above must be repeated; i.e., the dial 38 must be rotated clockwise from its "on" position of FIG. 9 to its "pilot" position of FIG. 6 before the dial 38 can be depressed to reset the safety holding device 78 and move the pilot valve member 94 to an open position; during the resetting operation, a pilot flow of gas is permitted but bleed gas and main gas flows are prevented by the plug valve 22.

Upon extinguishment of the flame at the pilot burner PB, the release of the safety holding device 78 causes upward movement of pilot valve ring 101 relative to the diaphragm pan 96 and forces the secondary valve element on the flexible diaphragm 91 into engagement with the secondary valve seat 31. Since the pilot flow inlet conduit 60 lies between the concentric valve seats 30 and 31, 100% shut off of all gas flow is secured upon closure of the pilot flow inlet conduit 60. The upward movement of the pilot valve ring 101 relative to the diaphragm pan 46 continues until the top end of stud 106 engages the diaphragm hub 95 whereupon the entire diaphragm assembly moves as unit with the diaphragm 91 being forced against both valve seats 30 and 31. Since the automatic safety mechanism must provide sufficient force to maintain the diaphragm 91 closed on the valve seats 30 and 31 against the high inlet pressure in inlet chamber 18, the operating pressure chamber 92 provides a balancing force on the other side of diaphragm 91 by means of the by-pass bleed line. As is shown in the released position of holding device 78 (FIG. 1) the stem bore 86 communicates with the by-pass bleed chamber 88 and a by-pass bleed flow may be traced from the inlet chamber 18 through the by-pass bleed conduit 89, the by-pass bleed chamber 88 and the stem bores 86 and 87 to the operating pressure chamber 92.

During normal operation of the control device, thermostatic cycling of the valve 69 effects on-off operation of the primary valve member 93 and during the "on" part of the operation, the primary valve member 93 regulates the main gas flow in accordance with the rate of flow in the bleed line which is regulated by the pressure regulator 74. Even though the diaphragm 91 has two valve elements 93 and 94, they are operated independently; i.e., valve element 93 is movable relative to primary valve seat 30 in response to control by components 70 and 74 and valve element 94 is movable relative to secondary valve seat 31 in response to control component 78. While these two valve elements 93 and 94 act independently and perform different controlling functions, they combine in operation with concentric closure over one primary flow passage thereby effectively limiting the pressure drop to a single flow passage. The limitation of the pressure drop effect to a single flow passage increases the capacity of the control while still providing independent valve seats and valve operating means.

Inasmuch as the present invention is subject to many variations, modifications and changes in details, it is intended that all matter contained in the foregoing description or shown on the accompanying drawings shall be interpreted as illustrative and not in a limiting sense.

What is claimed is:

1. In a control device, the combination comprising
a casing having a primary and secondary flow passages,
primary and secondary valve seats in said casing for said primary and secondary flow passages, respectively,
said secondary valve seat being radially spaced from said primary valve seat,
a diaphragm assembly including a pressure operated diaphragm and mounting means therefor,
primary and secondary valve members on said diaphragm cooperating with said primary and secondary valve seats, respectively,
safety means for closing said secondary valve member on said secondary valve seat, and
operating means for effecting movement of said primary valve member relative to said primary valve seat independently of said secondary valve member,
said primary and secondary valve elements being concentrically arranged on said diaphragm whereby a total pressure drop in said casing is limited to a pressure drop through the primary passage,
said mounting means including a plate member centrally attached to said diaphragm on a side thereof opposite said primary and secondary valve member,
resilient means engaging said plate member to bias said diaphragm toward said primary and secondary valve seats, and means movable relative to said plate member to force said secondary valve member against said secondary valve seat.

2. The invention as recited in claim 1 wherein said plate member includes an annular recess and slot means spaced from an outer periphery of said plate member, and wherein said movable means comprises a ring member disposed in said recess and having tab means slidably extending through said slot means, and a retainer plate attached to said tab means, and wherein said safety means includes a pivoted lever for moving said retainer plate and displacing said ring member out of said recess.

3. The invention as recited in claim 2 wherein said pivoted lever is movable between holding and released positions, said pivoted lever being displaced from said retainer plate while in its holding position whereby said diaphragm is free from interference during operation of its primary valve member.

4. The invention as recited in claim 1 wherein said operating means includes bleed line means communicating with said secondary flow passage and maintaining an operating pressure on said diaphragm.

5. The invention as recited in claim 4 wherein said operating means further includes thermostatically operated means and pressure regulating valve means in said bleed line means to effect on-off operations and modulating operation, respectively, of said primary valve member.

6. In a control device for supplying fuel to main and pilot burners, the combination comprising
a casing having inlet means adapted for connection to a source of fuel, main outlet means adapted for connection to the main burner, and pilot outlet means adapted for connection to the pilot burner,
pilot flow passage means between said inlet means and said pilot outlet means,
main flow passage means between said inlet means and said main outlet means,
manual valve means movable between "off," "pilot" and "on" controlling positions for controlling said pilot and main flow passage means,
pressure operated diaphragm means and mounting means therefor and having pilot and main valve means for controlling a fuel flow from said inlet means to said pilot and main flow passage means, respectively,
bleed line means adapted for communication with said pilot flow passage means to maintain an operating pressure on one side of said diaphragm means,
safety holding means energized in response to a flame at the pilot burner and including a stem movable from a holding position to a released position upon extinguishment of the flame at the pilot burner, and
lever means having one end in engagement with said stem and another end engageable with said diaphragm mounting means whereby movement of said stem to a released position causes said lever means to move said diaphragm mounting means and said pilot valve means to a closed position.

7. The invention as recited in claim 6 wherein said manual valve means includes a rotatable plug valve having porting means for controlling said pilot flow passage means and said bleed line means.

8. The invention as recited in claim 6 wherein said manual valve means includes a rotatable plug valve and a reset plunger axially extending therethrough, said reset plunger being depressible only when said plug valve is in its "pilot" position to move said diaphragm means to a valve open position and its mounting means into engagement with said another end of said lever means whereby said stem is reset to its holding position.

9. The invention as recited in claim 8 wherein said plug valve includes pilot flow groove means registering with pilot flow passage means when in its "pilot" position and registering with both said pilot flow passage means and said bleed line means when in its "on" position.

10. The invention as recited in claim 8 wherein said stem includes bleed flow means communicating with said bleed line means when in its holding position, and wherein said casing has a by-pass bleed passage communicating with said inlet means and communicating with the bleed flow means in said stem when in its released position.

11. The invention as recited in claim 10 wherein said bleed line means includes thermostatically operated valve means and pressure regulating valve means to control and regulate a bleed flow therethrough.

References Cited

UNITED STATES PATENTS

| | | | |
|---|---|---|---|
| 2,192,630 | 3/1940 | Beam | 236—80 X |
| 2,333,913 | 11/1943 | Beam | 236—80 X |
| 2,876,951 | 3/1959 | Matthews | 236—84 |
| 3,180,357 | 4/1965 | Galley | 236—1 HX |

EDWARD J. MICHAEL, *Primary Examiner.*

U.S. Cl. X.R.

137—66; 236—80; 431—54